United States Patent
Asao et al.

[11] Patent Number: 6,114,793
[45] Date of Patent: Sep. 5, 2000

[54] AUTOMOTIVE ALTERNATOR

[75] Inventors: Yoshihito Asao; Katsumi Adachi, both of Tokyo, Japan

[73] Assignee: Mitsubishi Denki Kabushiki Kaisha, Tokyo, Japan

[21] Appl. No.: 09/275,077

[22] Filed: Mar. 24, 1999

[30] Foreign Application Priority Data

Sep. 1, 1998 [JP] Japan .................................. 10-247309

[51] Int. Cl.$^7$ ....................................................... H02K 1/22
[52] U.S. Cl. .............................................. 310/263; 310/51
[58] Field of Search .................................... 310/263, 267, 310/51, 42, 179, 181, 254, 261; 29/596, 597, 598

[56] References Cited

U.S. PATENT DOCUMENTS

| | | | |
|---|---|---|---|
| 4,972,114 | 11/1990 | Frister | 310/263 |
| 5,270,605 | 12/1993 | Lefrancois et al. | 310/263 |
| 5,708,318 | 1/1998 | Fudono | 310/263 |

FOREIGN PATENT DOCUMENTS 3-74163  3/1991  Japan .
7-222415  8/1995  Japan .

*Primary Examiner*—Nestor Ramirez
*Assistant Examiner*—Tran Nguyen
*Attorney, Agent, or Firm*—Sughrue, Mion, Zinn, Macpeak & Seas, PLLC

[57] ABSTRACT

A pair of pole cores comprises shoulder portions positioned on both axial ends of the diametrically outermost portions of the claw-shaped magnetic poles formed into beveled or curved outer circumferential surfaces, and diametrically outermost leading-edge face portions positioned on the leading edges in the direction of rotation at both axial ends of the diametrically outermost portions of the claw-shaped magnetic poles each being formed into an outer circumferential surface inclined in a circumferential direction by a surface which passes through a point A where the inner circumferential edge of the diametrically outermost leading-edge face positioned on the leading edge in the direction of rotation of the diametrically outermost portion of each of the claw-shaped magnetic poles intersects a plane which passes through an axial end of the stator core and perpendicularly intersects the axis of the shaft, and a point B located on a ridge line where the diametrically outermost leading-edge face intersects the beveled or curved outer circumferential surface formed on the shoulder portion.

4 Claims, 9 Drawing Sheets

| α | 20° | 30° | 40° | 50° | 60° | 70° | 80° | 90° |
|---|---|---|---|---|---|---|---|---|
| HIGHER-ORDER NUMERICAL COMPONENT NOISE LEVEL (dB) at 14,000 r/min | 67 | 67 | 68 | 68 | 69 | 70 | 74 | 77 |
| OUTPUT (A) at 5,000 r/min | 64.5 | 67.3 | 70 | 71.5 | 73 | 74.5 | 76.2 | 78 |

DIRECTION OF ROTATION

AUTOMOTIVE ALTERNATOR

BACKGROUND OF THE INVENTION

1. Field of the Invention

The present invention relates to an automotive alternator having a Lundell-type rotor for mounting on an automobile engine, and in particular relates to the construction of a rotor for an automotive alternator which suppresses higher-order numerical component wind noise resulting from rotation of the rotor.

2. Description of the Related Art

FIG. 10 is a cross-section showing the construction of a conventional automotive alternator, and FIG. 11 is a perspective view of the rotor of the automotive alternator in FIG. 10.

A conventional automotive alternator comprises a Lundell-type rotor 7 mounted so as to be freely rotatable by means of a shaft 6 within a case 3 comprising a front bracket 1 and a rear bracket 2 which are made of aluminum, and a stator 8 secured to the inner wall of the case 3 so as to cover the outer periphery of the rotor 7.

The shaft 6 is rotatably supported by the front bracket 1 and the rear bracket 2. A pulley 4 is secured to one end of the shaft 6 to enable a rotational torque from an engine to be transmitted to the shaft 6 by means of a belt (not shown).

Slip rings 9 for supplying an electric current to the rotor 7 are secured to the other end of the shaft 6, and a pair of brushes 10 are housed in brush holders 11 disposed within the case 3 so as to slide in contact with the slip rings 9. A regulator 18 for regulating the output voltage of the stator 8 is adhered to a heat sink 17 fitted on the brush holders 11. A rectifier 12 electrically connected to the stator 8 for rectifying an alternating current generated in the coil of the stator 8 to a direct current is mounted within the case 3.

The rotor 7 comprises a rotor coil 13 which generates a magnetic flux when an electric current flows therein, and a pair of pole cores 20, 21 disposed so as to cover the rotor coil 13 in which magnetic poles are formed by the magnetic flux generated by the rotor coil 13. The pair of pole cores 20, 21 are made of iron, each has a plurality of trapezoidal claw-shaped magnetic poles 22, 23 projecting from an outer circumferential edge thereof at an equiangular pitch circumferentially, and the pole cores 20, 21 are secured to the shaft 6 facing each other so that the claw-shaped magnetic poles 22, 23 intermesh. In addition, fans 5 are secured to both ends of the rotor 7 in the axial direction.

The stator 8 comprises a stator core 15, and a stator coil 16 composed of wires wound around the stator core 15 in which an alternating current is generated by alternating the magnetic flux of the rotor 7 owing to the rotation of the rotor 7.

In a conventional automotive alternator constructed in this manner, a current is supplied from a battery (not shown) by means of the brushes 10 and the slip rings 9 to the rotor coil 13, and a magnetic flux is generated. The claw-shaped magnetic poles 22 of one pole core 20 are magnetized to N polarities by the magnetic flux, and the claw-shaped magnetic poles 23 of the other pole core 21 are magnetized to S polarities. On the other hand, the rotational torque of the engine is transmitted to the shaft 6 by means of the belt and the pulley 4 and the rotor 7 is rotated. Thus, a rotating magnetic field is imparted to the stator coil 16 and an electromotive force is generated in the stator coil 16. This alternating. electromotive force is rectified to a direct current by means of the rectifier 12, its voltage is regulated by the regulator 18, and the battery is recharged.

Now, in a general automotive alternator, because the inner circumferential surface of the stator coil 16 is irregular and the space between the stator coil 16 and the claw-shaped magnetic poles 22, 23 is narrow, wind chopping noises are generated as the rotor 7 rotates. Thus, in the above conventional automotive alternator, the wind chopping noises generated by the portions of the stator coil 16 and claw-shaped magnetic poles 22, 23 facing each other are suppressed by forming the shoulder portions of claw-shaped magnetic poles 22, 23 into a bevel or a curve, as shown in FIGS. 12 and 13. The suppression of the wind chopping noises generated by the portions of the stator coil 16 and claw-shaped magnetic poles 22, 23 facing each other by forming the shoulder portions of claw-shaped magnetic poles 22, 23 into a bevel or a curve in this manner has already been proposed in Japanese Patent No. 2617002 and Japanese Patent Laid-Open No. HEI 7-222415.

In a conventional automotive alternator constructed in this manner, the generation of wind chopping noises is suppressed by forming the shoulder portions of claw-shaped magnetic poles 22, 23 into a bevel or a curve, but the suppression of wind chopping noises is insufficient.

However, as a result of having diligently searched for the source of the wind chopping noises, the inventors have discovered that, besides the portions of the stator coil 16 and claw-shaped magnetic poles 22, 23 facing each other, unpleasant higher-order numerical component wind chopping noises are also generated by the diametrically outermost leading-edge face portions (indicated by P in FIG. 11) positioned on the leading edges in the direction of rotation of the rotor 7 at both axial ends of the diametrically outermost portions of the claw-shaped magnetic poles 22, 23.

In the conventional automotive alternator, no consideration has been given to the wind chopping noises generated by the diametrically outermost leading-edge face portions of the claw-shaped magnetic poles 22, 23, and consequently one problem has been that the wind chopping noises could not be sufficiently suppressed.

Another problem has been that when more material than necessary is removed from the claw-shaped magnetic poles 22, 23 to form the shoulder portions of claw-shaped magnetic poles 22, 23 into the bevel or the curve, the magnetic resistance in that portion increases and the magnetic flux generated by flowing an electric current in the rotor coil 13 during power generation decreases, reducing output.

SUMMARY OF THE INVENTION

The present invention aims to solve the above problems and an object of the present invention is to provide an automotive alternator capable of suppressing wind chopping noises while maintaining high output.

In order to achieve the above object, according to one aspect of the present invention, there is provided an automotive alternator comprising: a shaft supported in a case so as to be able to rotate freely; a rotor disposed in the case and composed of a pair of pole cores which have a plurality of trapezoidal claw-shaped magnetic poles projecting from outer circumferential edge portions thereof, respectively, and which are secured to said shaft facing each other so that the claw-shaped magnetic poles intermesh; and a stator having a stator core and a stator coil disposed within the case so as to be positioned around the periphery of the rotor, wherein each of shoulder portions positioned on both axial ends of the diametrically outermost portions of the claw-shaped magnetic poles is formed into a beveled or curved outer circumferential surface, and each of diametrically outermost leading-edge face portions positioned on the leading edges in the direction of rotation at both axial ends of the diametrically outermost portions of the claw-shaped magnetic poles is formed into an outer circumferential surface inclined in a circumferential direction by a surface which passes through a point A where the inner circumferential edge of the diametrically outermost leading-edge face positioned on the leading edge in the direction of rotation of the diametrically outermost portion of each of the claw-shaped magnetic poles intersects a plane which passes through an axial end of the stator core and perpendicularly intersects the axis of the shaft, and a point B located on a ridge line where the diametrically outermost leading-edge face intersects the beveled or curved outer circumferential surface formed on the shoulder portion.

DETAILED DESCRIPTION OF THE PREFERRED EMBODIMENTS

The preferred embodiments of the present invention will now be explained with reference to the drawings.
Embodiment 1

Figure 1:
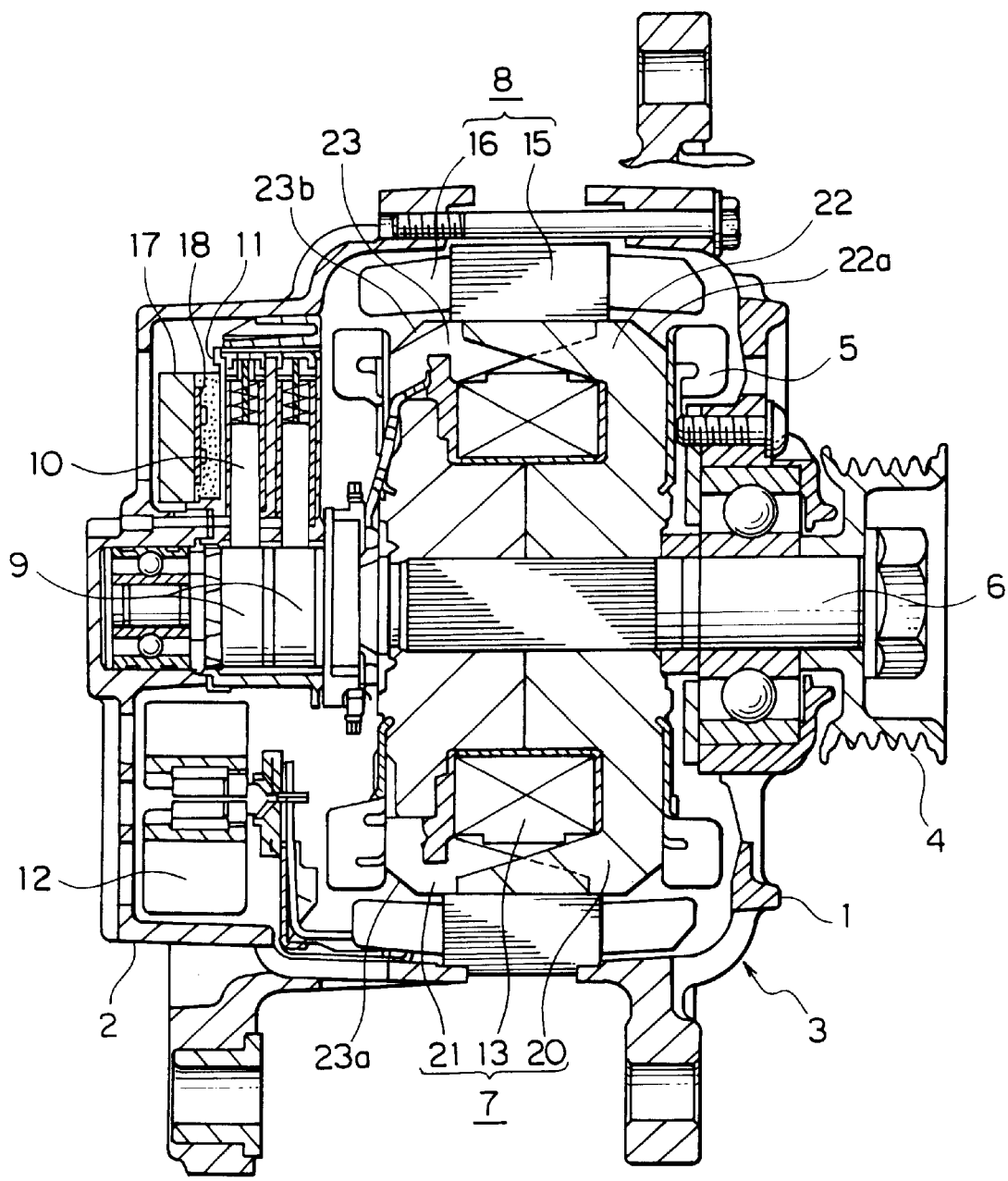
FIG. 1 is a cross-section of an automotive alternator according to Embodiment 1 of the present invention.
Figure 2:
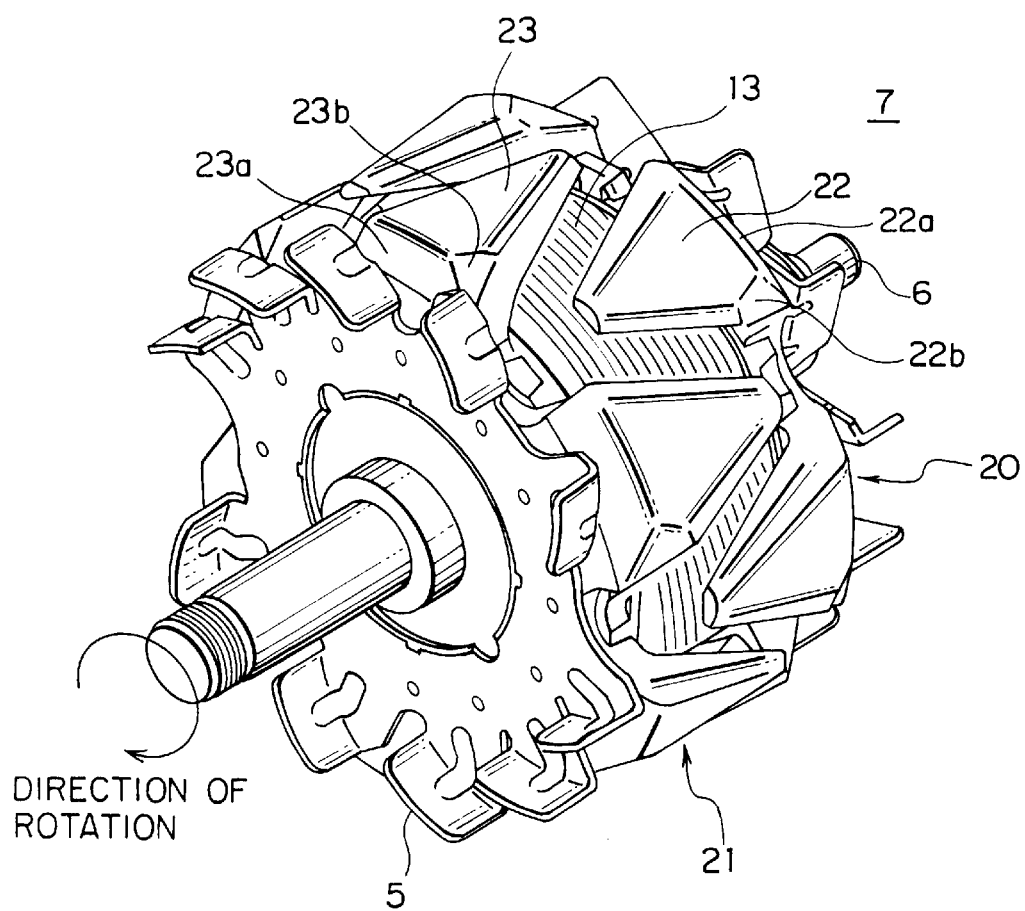
FIG. 2 is a perspective view of the rotor of the automotive alternator according to Embodiment 1 of the present invention.

FIG. 1 is a cross-section of an automotive alternator according to Embodiment 1 of the present invention, and FIG. 2 is a perspective view of the rotor of the automotive alternator in FIG. 1.

In FIGS. 1 and 2, the automotive alternator comprises a Lundell-type rotor 7 mounted so as to be freely rotatable by means of a shaft 6 within a case 3 comprising a front bracket 1 and a rear bracket 2 which are made of aluminum, and a stator 8 secured to the inner wall of the case 3 so as to cover the outer peripery of the rotor 7.

The shaft 6 is rotatably supported by the front bracket 1 and the rear bracket 2. A pulley 4 is secured to one end of the shaft 6 to enable a rotational torque from an engine to be transmitted to the shaft 6 by means of a belt (not shown).

Slip rings 9 for supplying an electric current to the rotor 7 are secured to the other end of the shaft 6, and a pair of brushes 10 are housed in brush holders 11 disposed within the case 3 so as to slide in contact with the slip rings 9. A regulator 18 for regulating the output voltage of the stator 8 is adhered to a heat sink 17 fitted on the brush holders 11. A rectifier 12 electrically connected to the stator 8 for rectifying an alternating current generated in the coil of the stator 8 to a direct current is mounted within the case 3.

The rotor 7 comprises a rotor coil 13 which generates a magnetic flux when an electric current floes therein, and a pair of pole cores 20, 21 disposed so as to cover the rotor coil 13 in which magnetic poles are formed by the magnetic flux generated by the rotor coil 13. The pole cores 20,21 each have a plurality of trapezoidal claw-shaped magnetic poles 22, 23 projecting from outer circumferential edges thereof at an equiangular pitch circumferentially, and shoulder-portion beveled portions 22a, 23a are formed on outer circumferential edge portions of the diametrically outermost portions of the claw-shaped magnetic poles 22, 23, and in addition, circumferential beveled portions 22b, 23b are formed in face portions of the diametrically outermost portions of the claw-shaped magnetic poles 22, 23 positioned on the leading edges in the direction of rotation of the rotor 7. The pair of pole cores 20, 21 are secured to the shaft 6 facing each other so that the claw-shaped magnetic poles 22, 23 intermesh. In addition, fans 5 are secured to both ends of the rotor 7 in the axial direction.

The stator 8 comprises a stator core 15, and a stator coil 16 composed of wires wound around the stator core 15 in which an alternating current is generated by alternating the magnetic flux of the rotor 7 owing to the rotation of the rotor 7.

Figure 3:
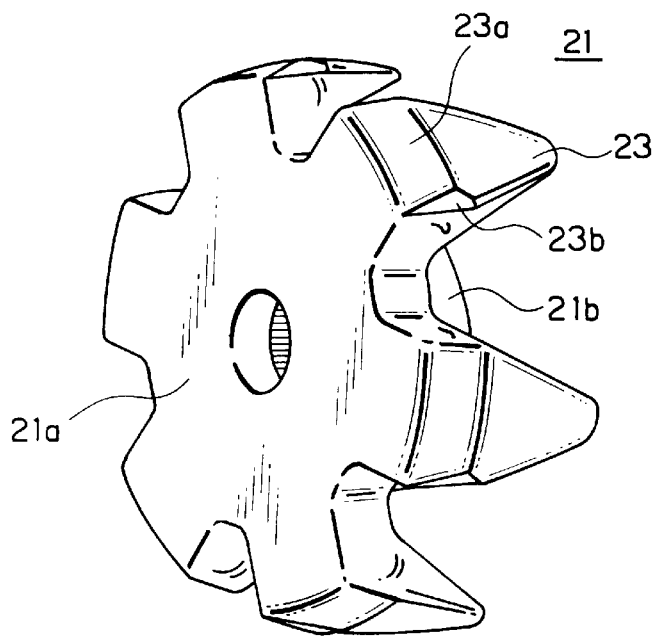
FIG. 3 is a perspective view of one of the pole cores constituting part of the rotor of the automotive alternator according to Embodiment 1 of the present invention.
Figure 4:
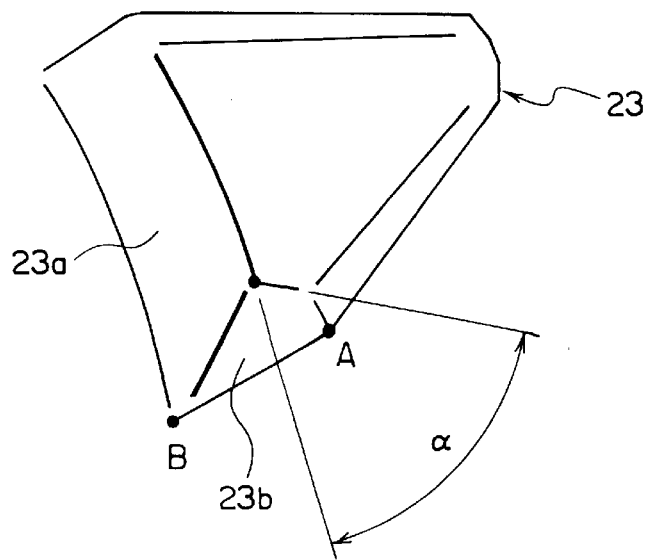
FIG. 4 is a plan view of part of a claw-shaped magnetic pole of one of the pole cores constituting part of the rotor of the automotive alternator according to Embodiment 1 of the present invention.

Next, the shape of the pole cores will be explained with reference to FIGS. 3 and 4.

A pole core 21 is formed by forging low-carbon steel, for example, and comprises a disk-shaped main body portion 21a, a cylindrical yoke 21b projecting from the middle of one side of the main body portion 21a, and claw-shaped magnetic poles 23 extending radially outwards from the outer circumference of the main body portion 21a thereafter bending to one side in the axial direction. In this case, there are six claw-shaped magnetic poles 23 projecting from the outer circumferential edge of the main body portion 21a at the equiangular pitch circumferentially, and the bent portions thereof are trapezoidal in shape.

A shoulder portion positioned at an axial end of the diametrically outermost-portion of each claw-shaped magnetic pole 23 is formed into a beveled outer circumferential surface, constituting a shoulder-portion beveled portion 23a. In other words, the shoulder-portion beveled portion 23a has a profile which its radius gradually decreases in an incline from the outer circumferential surface of the diametrically outermost portion of the claw-shaped magnetic pole 23 towards the end surface of the diametrically outermost portion.

Moreover, the diametrically outermost leading-edge face portion of the claw-shaped magnetic pole 23 positioned on the leading edge in the direction of rotation at an axial end of the diametrically outermost portion of the claw-shaped magnetic pole 23 is formed into a beveled shape, constituting a circumferential-direction beveled portion 23b. The circumferential-direction beveled portion 23b is an outer circumferential surface inclined in a circumferential direction formed by a surface which passes through a point A where the inner circumferential edge of the diametrically outermost leading-edge face positioned on the leading edge in the direction of rotation of the diametrically outermost portion of the claw-shaped magnetic pole 23 intersects a plane which passes through an axial end of the stator core 15 and perpendicularly intersects the axis of the stator core 15, and a point B where the shoulder-portion beveled portion 23a and the end surface of the claw-shaped magnetic pole 23 intersect on the diametrically outermost leading-edge face of the claw-shaped magnetic pole 23. The angle $\alpha$, defined by a ridge line where the outer circumferential surface of the diametrically outermost portion of the claw-shaped magnetic pole 23 intersects the shoulder-portion beveled portion 23a and a ridge line where the outer circumferential surface of the diametrically outermost portion of the claw-shaped magnetic pole 23 intersects the circumferential-direction beveled portion 23b, is formed at 70 degrees.

Furthermore, as with the pole core 21, a shoulder-portion beveled portion 22a and a circumferential-direction beveled portion 22b are also formed in each of the claw-shaped magnetic poles 22 of the pole core 20.

The pole cores 20, 21 are secured to the shaft 6 facing each other so that the claw-shaped magnetic poles 22, 23 intermesh, the rotor coil 13 being wound on the yokes of the pole cores 20, 21. The circumferential-direction beveled portions 22b, 23b of the claw-shaped magnetic poles 22, 23 are positioned on the leading edge in the direction of rotation.

Figure 9:
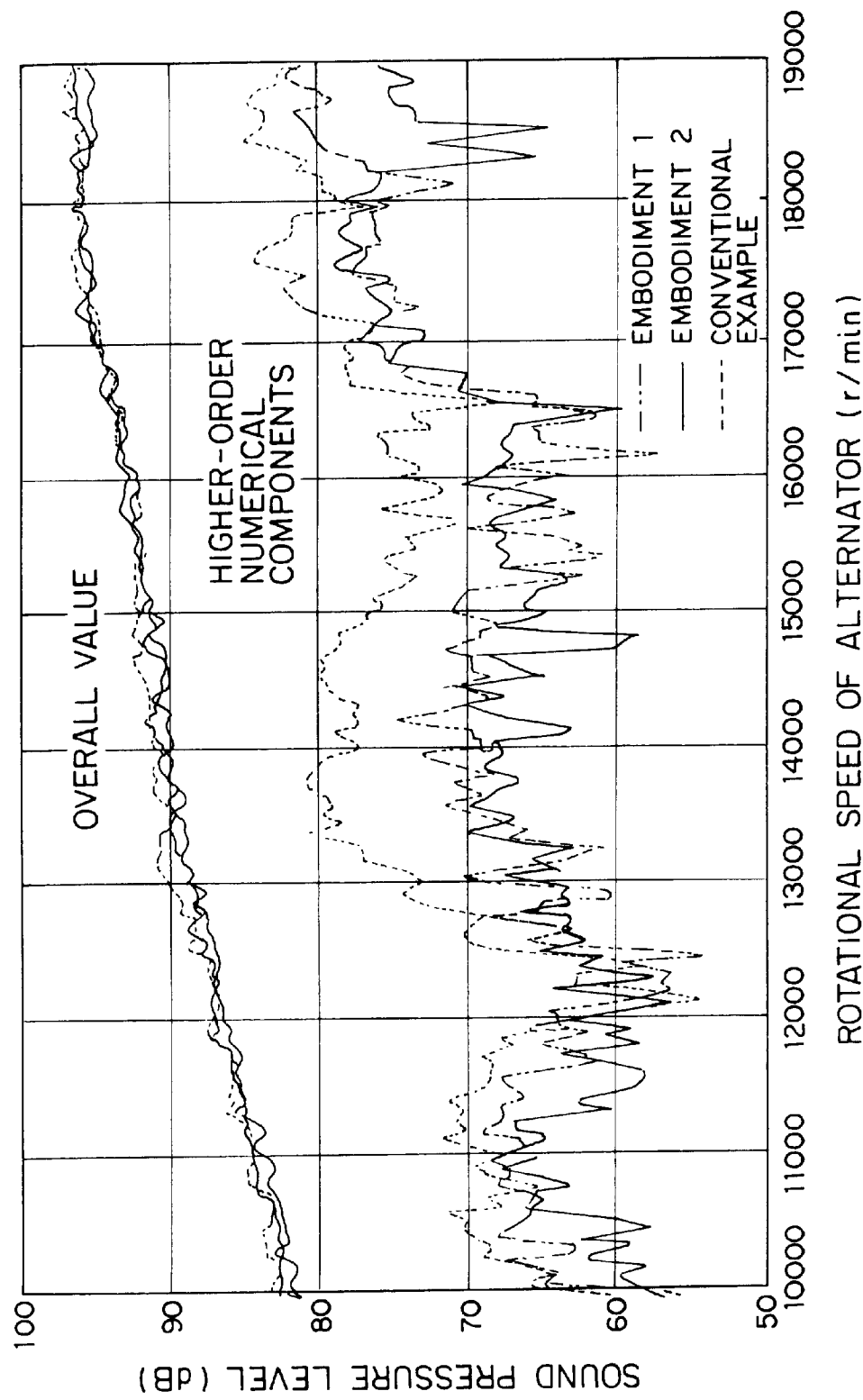
FIG. 9 is a graph showing the relationship between the rotational speed and the sound pressure level in an automotive alternator according to the present invention.
Figure 10:
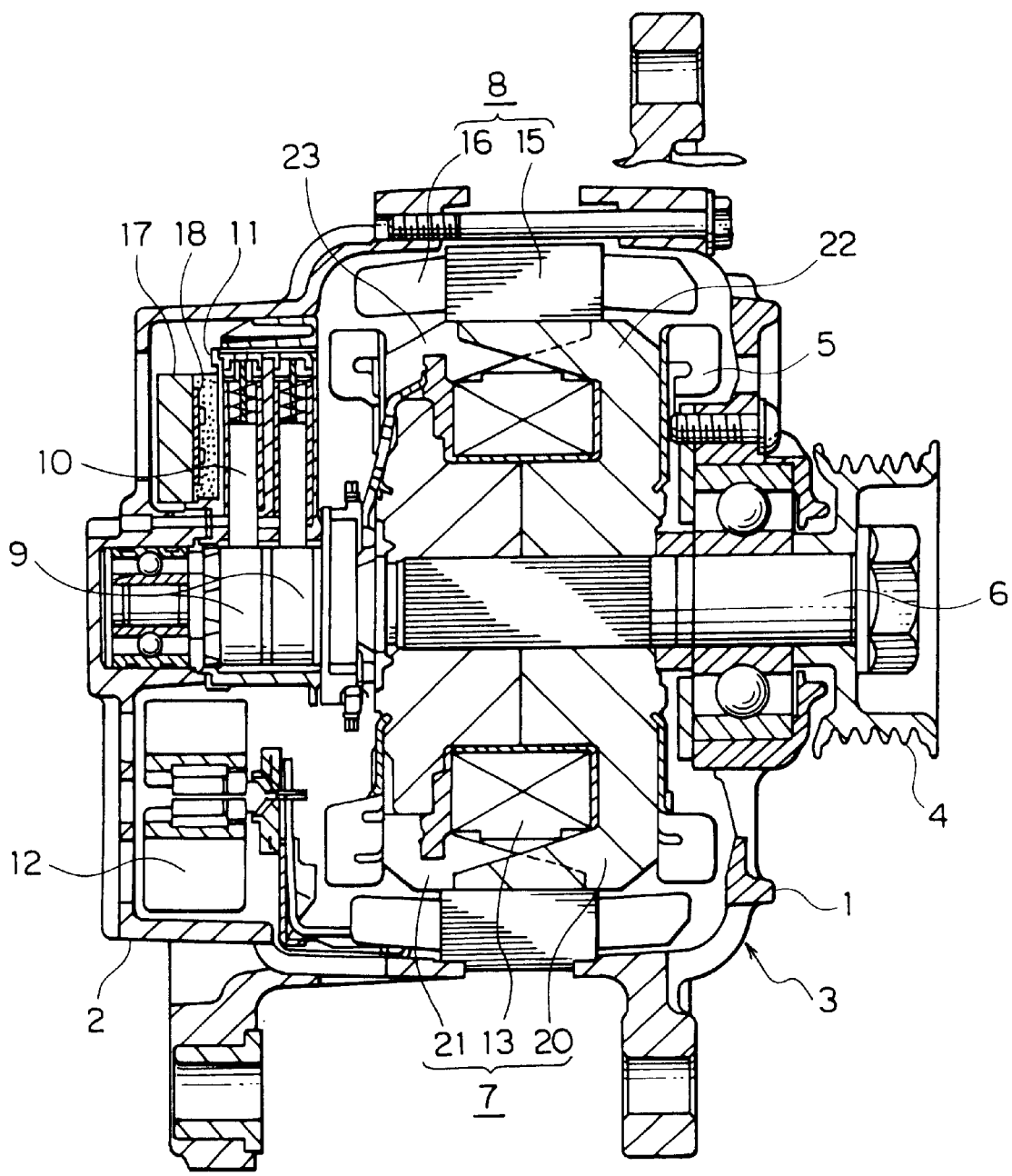
FIG. 10 is a cross-section of a conventional automotive alternator.
Figure 11:
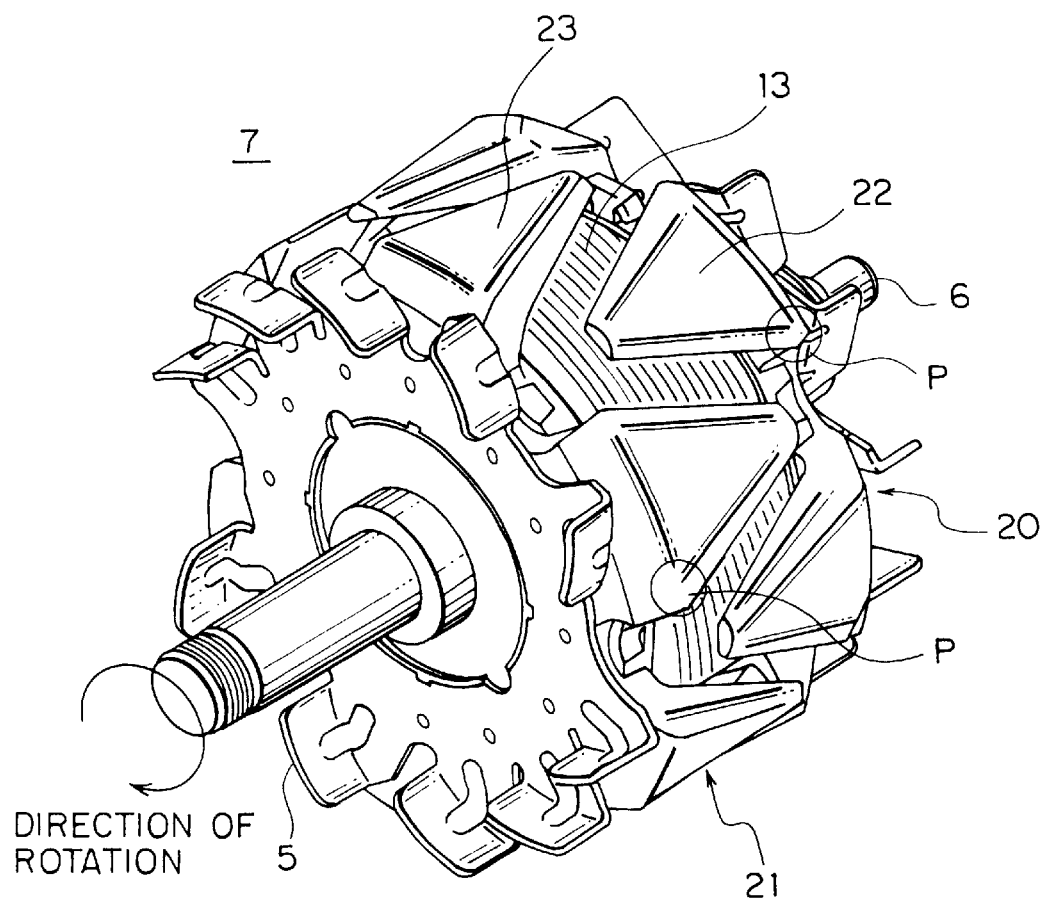
FIG. 11 is a perspective view of the rotor of the conventional automotive alternator.
Figure 12:
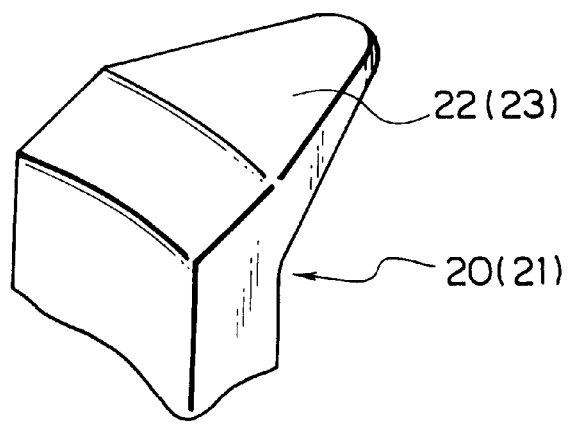
FIG. 12 is a partial perspective view of an example of a pole core constituting part of the rotor of a conventional automotive alternator.
Figure 13:
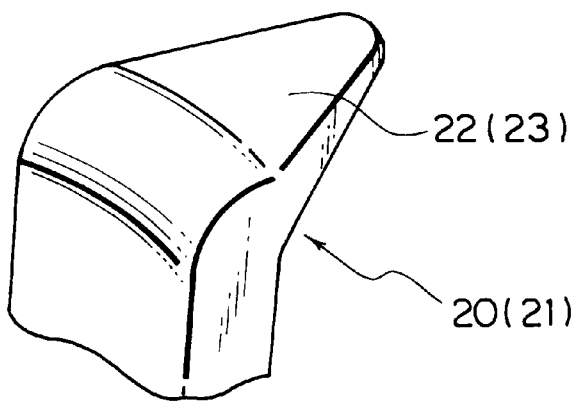
FIG. 13 is a partial perspective view of another example of a pole core constituting part of the rotor of a conventional automotive alternator.

The results of measuring the sound pressure levels of an automotive alternator constructed in this manner are given in FIG. 9. Furthermore, in FIG. 9, the measured results for the automotive alternator according to Embodiment 1 are indicated by the double-dot-and-dash line, and for comparison the measured results for an example of a conventional automotive alternator are indicated by the broken line.

From FIG. 9 it can be seen that, compared to the conventional example, the automotive alternator according to Embodiment 1 achieved a maximum reduction in unpleasant higher-order numerical components of 10 dB in the high-revolution region of 12,000 rpm or more where noise problems arise in an average automobile. Furthermore, a maximum reduction of 2 dB was also achieved for the overall value, which is the sum of all of the components. This indicates that the higher-order numerical component wind noise generated by the diametrically outermost leading-edge faces of the claw-shaped magnetic poles 22, 23 positioned on the leading edges in the direction of rotation of the rotor 7 was reduced by forming the circumferential-direction beveled portions 22b, 23b on the claw-shaped magnetic poles 22, 23.

Figures 5, 6:
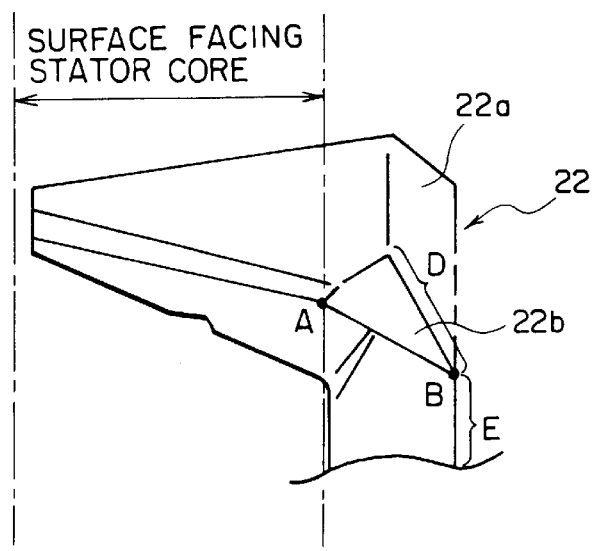
FIG. 5 is a table showing the relationship between an angle α and the noise level at 14,000 rpm in the automotive alternator according to Embodiment 1 of the present invention.
FIG. 6 is a diagram explaining the positional relationship between the claw-shaped magnetic poles of the pole cores and the stator core in the automotive alternator according to Embodiment 1 of the present invention.

Next, automotive alternators were prepared using pole cores 20, 21 formed with circumferential-direction beveled portions 22b, 23b in which points A and B were fixed and the angle $\alpha$ was varied, and the results of measuring the sound pressure levels at 14,000 rpm, the rotational speed at which wind noise peaks, are given in FIG. 5.

From FIG. 5 it can be seen that the noise level increases when the angle $\alpha$ exceeds 70 degrees and wind noise reduction effects decrease. On the other hand, it can be seen that output deteriorates as the angle $\alpha$ is reduced, but the deterioration is particularly large when the angle $\alpha$ is 40 degrees or less. Thus, when noise reduction effects and output are considered, it is desirable that the angle $\alpha$ be greater than or equal to 40 degrees and less than or equal to 70 degrees.

Furthermore, in Embodiment 1, point B is defined as the point of intersection between the shoulder-portion beveled portion 22a (23a) on the diametrically outermost leading-edge face of the claw-shaped magnetic pole 22 (23) and the end surface of the claw-shaped magnetic pole 22 (23), but the same effects were obtained as in Embodiment 1 when point B was disposed on a ridge line where the shoulder-portion beveled portion 22a and the diametrically outermost leading-edge face of the claw-shaped magnetic pole 22 intersect (the region indicated by D in FIG. 6).

However, when point B was disposed radially inwards from the point of intersection between the shoulder-portion beveled portion 22a (23a) on the diametrically outermost leading-edge face of the claw-shaped magnetic pole 22 (23) and the end surface of the claw-shaped magnetic pole 22 (23) (the region indicated by E in FIG. 6), although the same wind noise reduction effects were obtained as in Embodiment 1, it was found that output decreased significantly.

Embodiment 2

Figure 7:
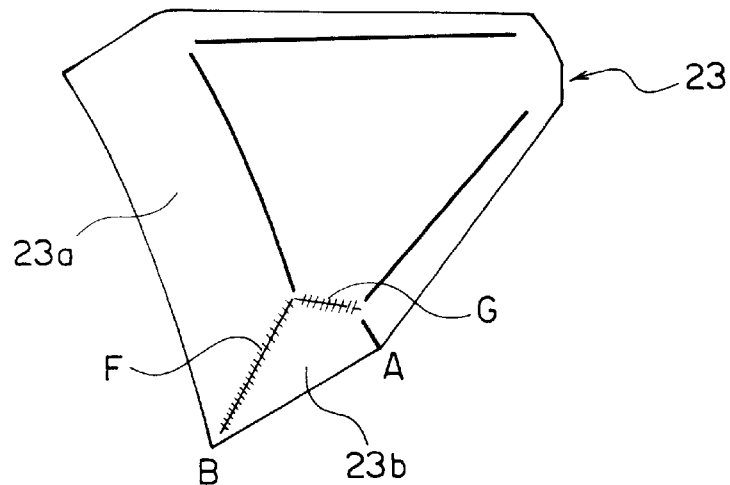
FIG. 7 is a plan view of part of a part of a claw-shaped magnetic pole of one of the pole cores constituting part of the rotor of an automotive alternator according to Embodiment 2 of the present invention.

In Embodiment 2, as shown in FIG. 7, ridge line portions F, G on the claw-shaped magnetic poles 23, where the circumferential-direction beveled portions 23b intersect the shoulder-portion beveled portions 23a and the outer circumferential surfaces of the diametrically outermost portions, are formed into curves R2 (with a diameter of 2 mm). Although not shown, the same shape is also adopted on the claw-shaped magnetic poles 22.

Moreover, all other parts of the construction are the same as in Embodiment 1.

The results of measuring the sound pressure levels of an automotive alternator according to Embodiment 2 are indicated by the solid line in FIG. 9.

From FIG. 9 it can be seen that Embodiment 2 was able to further reduce unpleasant higher-order numerical components compared to Embodiment 1 above in the high-revolution region of 12,000 rpm or more.

In other words, according to Embodiment 2, unpleasant higher-order numerical component wind noise generated by the ridge line portions where the circumferential-direction beveled portions 22b, 23b intersect the shoulder-portion beveled portions 22a, 23a and the outer circumferential surfaces of the diametrically outermost portions was reduced.

Embodiment 3

Figure 8:
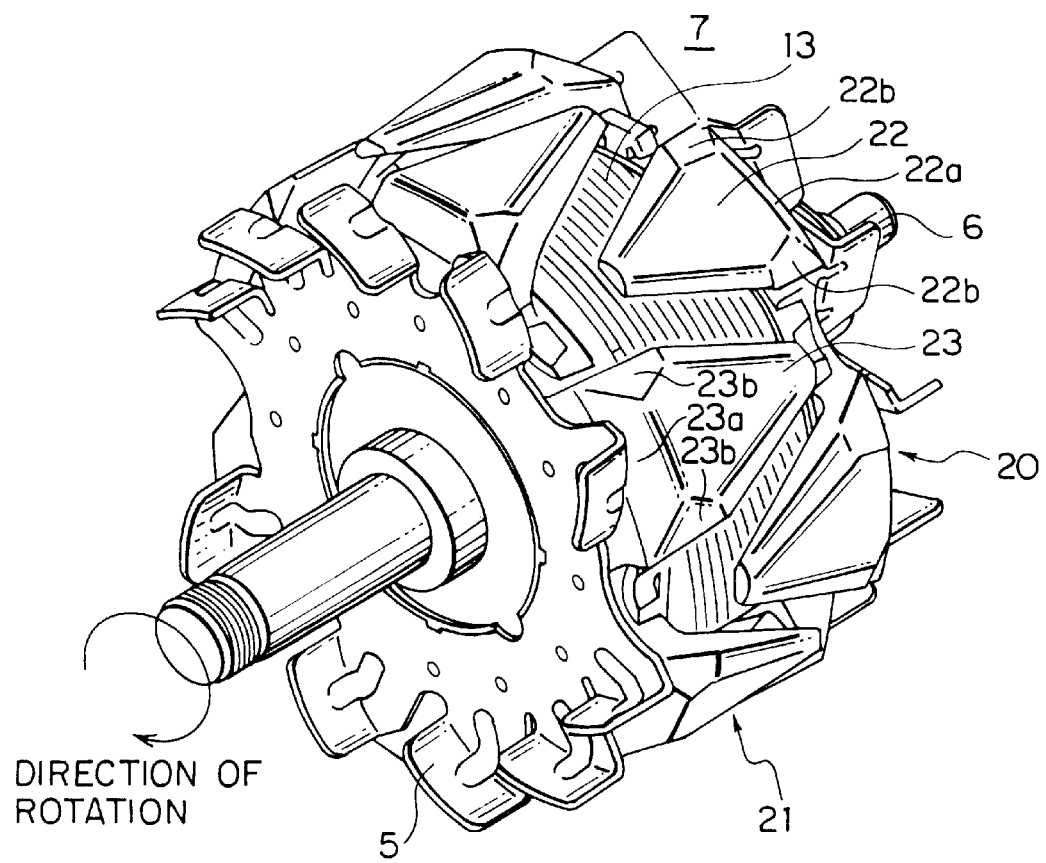
FIG. 8 is a perspective view of the rotor of an automotive alternator according to Embodiment 3 of the present invention.

In Embodiment 3, as shown in FIG. 8, circumferential-direction beveled portions 22b, 23b are formed in both faces in the circumferential direction, that is, the diametrically outermost leading-edge face and the diametrically outermost trailing-edge face, of the claw-shaped magnetic poles 22, 23 of the pole cores 20, 21.

Moreover, all other parts of the construction are the same as in Embodiments 1 and 2.

In Embodiments 1 and 2 above, the circumferential-direction beveled portions 22b, 23b are formed in only one circumferential-side face of the claw-shaped magnetic poles 22, 23. Thus, the claw-shaped magnetic poles 22, 23 are asymmetrical and require specific claw-shaped magnetic poles for the front side and for the rear side of the alternator, which increases the number of parts and complicates assembly.

However, according to Embodiment 3, the claw-shaped magnetic poles 22, 23 are symmetrical, enabling the same pole cores to be used for both the front side and the rear side of the alternator, which reduces the number of parts and facilitates assembly.

Moreover, in each of the above embodiments, beveled shoulder-portion beveled portions 22a, 23a are formed on the shoulder portions of the claw-shaped magnetic poles 22, 23, but the same effects can be achieved by forming curved shoulder-portion curved portions in the shoulder portions of the claw-shaped magnetic poles 22, 23.

The present invention is constructed in the above manner and exhibits the effects described below.

According to one aspect of the present invention, there is provided an automotive alternator comprising: a shaft supported in a case so as to be able to rotate freely; a rotor disposed in the case and composed of a pair of pole cores which have a plurality of trapezoidal claw-shaped magnetic poles projecting from outer circumferential edge portions thereof, respectively, and which are secured to the shaft facing each other so that the claw-shaped magnetic poles intermesh; and a stator having a stator core and a stator coil disposed within the case so as to be positioned around the peripery of the rotor, wherein each of shoulder portions positioned on both axial ends of the diametrically outermost portions of the claw-shaped magnetic poles is formed into a beveled or curved outer circumferential surface, and each of diametrically outermost leading-edge face portions positioned on the leading edges in the direction of rotation at both axial ends of the diametrically outermost portions of the claw-shaped magnetic poles is formed into an outer circumferential surface inclined in a circumferential direction by a surface which passes through a point A where the inner circumferential edge of the diametrically outermost leading-edge face positioned on the leading edge in the direction of rotation of the diametrically outermost portion of each of the claw-shaped magnetic poles intersects a plane which passes through an axial end of the stator core and perpendicularly intersects the axis of the shaft, and a point B located on a ridge line where the diametrically outermost leading-edge face intersects the beveled or curved outer circumferential surface formed on the shoulder portion. Thus, it is possible to provide an automotive alternator capable of effectively reducing wind chopping noises generated by the portions of the stator coil and claw-shaped magnetic poles facing each other and also by the diametrically outermost leading-edge face portions of the claw-shaped magnetic poles, and thus capable of suppressing wind noise.

Ridge line portions, where the circumferentially-inclined outer circumferential surfaces formed in the diametrically outermost leading-edge face portions of the claw-shaped magnetic poles intersect the beveled or curved outer circumferential surfaces formed on the shoulder portions and the outer circumferential surfaces of the diametrically outermost portion, are formed into curves, thereby enabling wind chopping sounds generated in the ridge line portions to be reduced and wind noise to be further suppressed.

The angle $\alpha$, defined by a ridge line where the beveled or curved outer circumferential surface formed on the shoulder portion intersects the outer circumferential surface of the diametrically outermost portion of the claw-shaped magnetic pole and a ridge line where the circumferentially-inclined outer circumferential surface formed in the diametrically outermost leading-edge face portion of the claw-shaped magnetic pole intersects the outer circumferential surface of the diametrically outermost portion of the claw-shaped magnetic pole, is greater than or equal to 40 degrees and less than or equal to 70 degrees, thereby enabling wind noise to be effectively suppressed without reducing output.

The claw-shaped magnetic poles are formed in a symmetrical shape by further forming diametrically outermost trailing-edge face portions positioned on the trailing edges in the direction of rotation at both axial ends of the diametrically outermost portions of the claw-shaped magnetic poles into an outer circumferential surface inclined in a circumferential direction by a surface which passes through a point A where the inner circumferential edge of the diametrically outermost trailing-edge face positioned on the trailing edge in the direction of rotation of the diametrically outermost portion of each of the claw-shaped magnetic poles intersects a plane which passes through an axial end of the stator core and perpendicularly intersects the axis of the shaft and a point B located on a ridge line where the diametrically outermost trailing-edge face intersects the beveled or curved outer circumferential surface formed on the shoulder portion, enabling the same pole cores to be used for both the front and rear sides, thereby reducing the number of parts and facilitating assembly.

What is claimed is:

1. An automotive alternator comprising:

a shaft supported in a case so as to be able to rotate freely;

a rotor disposed in said case and composed of a pair of pole cores which have a plurality of trapezoidal claw-shaped magnetic poles projecting from outer circumferential edge portions thereof, respectively, and which are secured to said shaft facing each other so that said claw-shaped magnetic poles intermesh; and a stator having a stator core and a stator coil disposed within said case so as to be positioned around the periphery of said rotor, wherein each of shoulder portions positioned on both axial ends of the diametrically outermost portions of said claw-shaped magnetic poles is formed into a beveled or curved outer circumferential surface; and each of diametrically outermost leading-edge face portions positioned on the leading edges in the direction of rotation at both axial ends of said diametrically outermost portions of said claw-shaped magnetic poles is formed into an outer circumferential surface inclined in a circumferential direction by a surface which passes through a point A where the inner circumferential edge of a diametrically outermost leading-edge face positioned on said leading edge in the direction of rotation of said diametrically outermost portion of each of said claw-shaped magnetic poles intersects a plane which passes through an axial end of said stator core and perpendicularly intersects the axis of said shaft, and a point B located on a ridge line where said diametrically outermost leading-edge face intersects said beveled or curved outer circumferential surface formed in said shoulder portion, wherein an angle $\alpha$, defined by a ridge line where said beveled or curved outer circumferential surface formed on said shoulder portion intersects the outer circumferential surface of said diametrically outermost portion of said claw-shaped magnetic pole and a ridge line where said circumferentially-inclined outer circumferential surface formed in said diametrically outermost leading-edge face portion of said claw-shaped magnetic pole intersects said outer circumferential surface of said diametrically outermost portion of said claw-shaped magnetic pole, is greater than or equal to 40 degrees and less than or equal to 70 degrees.

2. An automotive alternator comprising:

a shaft supported in a case so as to be able to rotate freely;

a rotor disposed in said case and composed of a pair of pole cores which have a plurality of trapezoidal claw-shaped magnetic poles projecting from outer circumferential edge portions thereof, respectively, and which are secured to said shaft facing each other so that said claw-shaped magnetic poles intermesh; and a stator having a stator core and a stator coil disposed within said case so as to be positioned around the periphery of said rotor, wherein each of shoulder portions positioned on both axial ends of the diametrically outermost portions of said claw-shaped magnetic poles is formed into a beveled or curved outer circumferential surface; and each of diametrically outermost leading-edge face portions positioned on the leading edges in the direction of rotation at both axial ends of said diametrically outermost portions of said claw-shaped magnetic poles is formed into an outer circumferential surface inclined in a circumferential direction by a surface which passes through a point A where the inner circumferential edge of a diametrically outermost leading-edge face positioned on said leading edge in the direction of rotation of said diametrically outermost portion of each of said claw-shaped magnetic poles intersects a plane which passes through an axial end of said stator core and perpendicularly intersects the axis of said shaft, and a point B located on a ridge line where said diametrically outermost leading-edge face intersects said beveled or curved outer circumferential surface formed in said shoulder portion, wherein ridge line portions where said circumferentially-inclined outer circumferential surfaces formed in said diametrically outermost leading-edge face portions of said claw-shaped magnetic poles intersect said beveled or curved outer circumferential surfaces formed on said shoulder portions and said outer circumferential surfaces of said diametrically outermost portion are formed of rounded edges.

3. The automotive alternator according to claim 1, wherein an angle $\alpha$, defined by a ridge line where said beveled or curved outer circumferential surface formed on said shoulder portion intersects the outer circumferential surface of said diametrically outermost portion of said claw-shaped magnetic pole and a ridge line where said circumferentially-inclined outer circumferential surface formed in said diametrically outermost leading-edge face portion of said claw-shaped magnetic pole intersects said outer circumferential surface of said diametrically outermost portion of said claw-shaped magnetic pole, is greater than or equal to 40 degrees and less than or equal to 70 degrees.

4. The automotive alternator according to claim 1, wherein said claw-shaped magnetic poles are formed in a symmetrical shape by further forming each of the diametrically outermost trailing-edge face portions positioned on the trailing edge in the direction of rotation at both axial ends of said diametrically outermost portions of said claw-shaped magnetic poles into an outer circumferential surface inclined in a circumferential direction by a surface which passes through a point A where the inner circumferential edge of a diametrically outermost trailing-edge face positioned on said trailing edge in the direction of rotation of said diametrically outermost portion of each of said claw-shaped magnetic poles intersects a plane which passes through an axial end of said stator core and perpendicularly intersects the axis of said shaft, and a point B located on a ridge line where said diametrically outermost trailing-edge face intersects said beveled or curved outer circumferential surface formed on said shoulder portion.

\* \* \* \* \*